Dec. 13, 1966   R. C. CROSS   3,291,497
PISTON RINGS AND PISTON-AND-RING ASSEMBLIES
Filed July 8, 1963
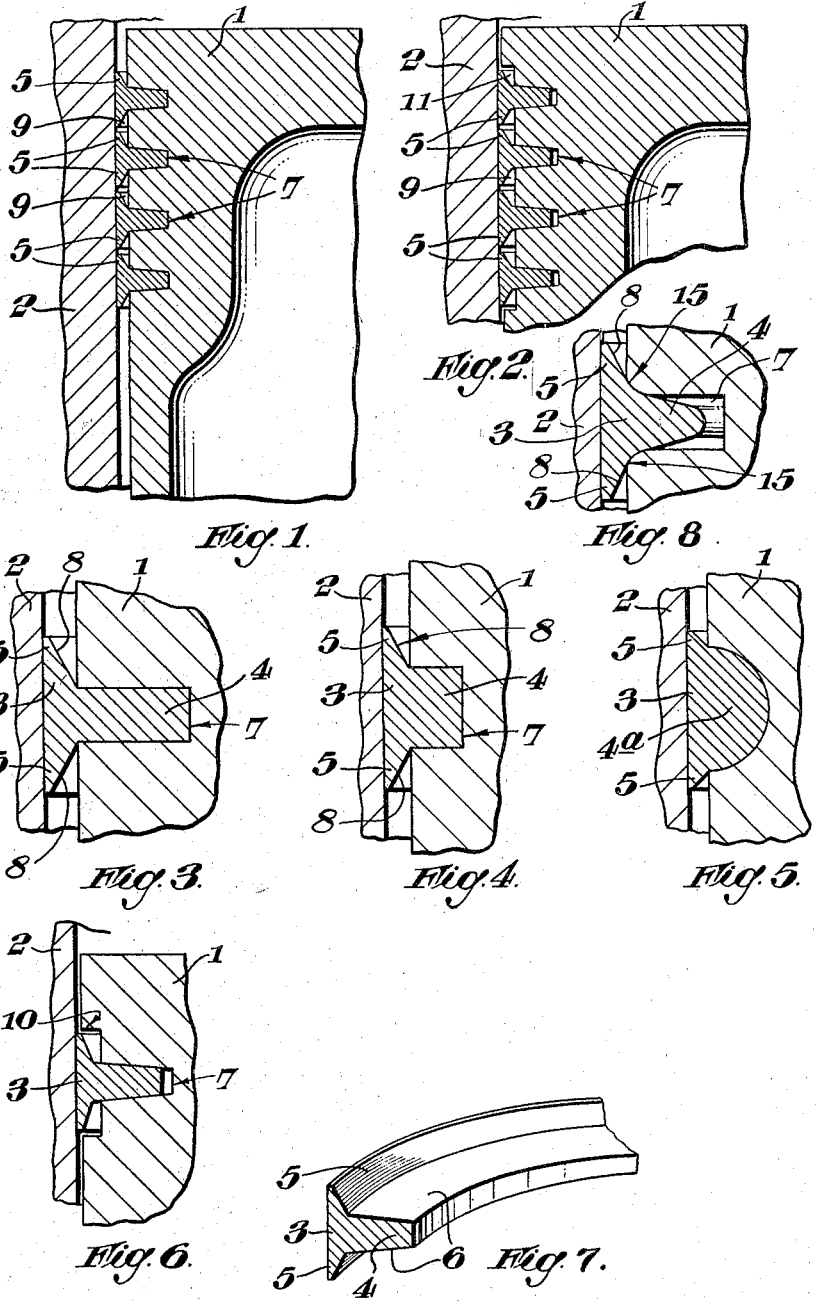
INVENTOR
ROLAND C. CROSS 3,291,497
PISTON RINGS AND PISTON-AND-RING
ASSEMBLIES
Roland Claude Cross, 33 Midford Road, Combe Down,
Bath, Somerset, England
Filed July 8, 1963, Ser. No. 293,410
Claims priority, application Great Britain, Feb. 14, 1963,
5,995/63
2 Claims. (Cl. 277—169)

This invention has reference to improvements in piston rings and to piston-and-ring assemblies particularly for internal combustion engines. The primary object of the invention is to provide a piston ring having excellent oil scraping qualities. A further object is to produce a ring having a large cylinder-contacting area without unduly increasing the weight of the ring. A still further object is to provide a ring which, when used in groups, forms a composite cylinder-engaging surface or mattress with the minimum of interruption between adjacent rings. A ring according to the invention may be used as a bearer ring, i.e. constructed always to stand proud of the piston under all working conditions to prevent the latter contacting the cylinder wall, and in this respect the comparatively large area for contacting the cylinder wall in relation to the reduction in weight and number of rings necessary as compared with known rings is of considerable advantage.

According to the invention, a piston ring, in cross-section, is formed with a body portion for housing in a piston groove, the body portion having a cylinder-contacting head wider than itself formed by a projecting ear in the section on each side of the body in the axial direction of the ring, said ears being respectively the sections of flanges extending axially from the two flat faces of the ring at its outer edges. The body portion and its head may constitute substantially a T-section of which the stem of the T is the groove-engaging body and the cross-bar thereof is the head of which the outer peripheral surface is designed to run on the cylinder wall. In this case the stem can be substantially rectilinear in form for housing in a piston groove of corresponding section, or it may be tapered symmetrically and inwardly from the head to the bottom of the stem. Such a form is useful for diesel engines as it avoids sticking.

In another embodiment the body portion is of substantially D section with the projecting ears continuing from the flat face of the D, and in all the constructions it is desirable to slope the projecting ears upwards on their respective inner faces from the body towards their tips.

The invention also includes piston-and-ring assemblies in which a plurality of rings with the sloping ears are mounted around a piston in grooves corresponding to the shape of the body section with their respective heads spaced from one another to form oil-catching spaces between the ring heads and piston for the reception of oil scraped from the cylinder wall.

The invention is applicable to annular rings which lie in a flat plane being split or gapped as usual with known gapped piston rings, or to helical rings, and in the latter case a single helical coil, or each convolution of a multi-coil helix is referred to herein as a ring to accord with the usual term "piston ring." Similarly each convolution of a helical groove in the piston is referred to as "a groove."

Some embodiments of the invention will be described, by way of example, with the aid of the accompanying drawings wherein:

FIGURE 1 shows in section a portion of a piston having mounted thereon some rings according to the invention;

FIGURE 2 is a view similar to FIGURE 1 but with the piston groove somewhat different;

FIGURES 3–5 show various alternative sections of ring;

FIGURE 6 shows a single ring mounted in a manner somewhat similar to the plurality depicted in FIGURE 2;

FIGURE 7 is a perspective view of a fragment of ring shaped according to those shown in FIGURES 1, 2 and 6; and FIGURE 8 shows a further alternative section for the ring working in a flared groove.

Like reference numerals indicate the same or corresponding parts in the several views.

It will be convenient first to describe the ring seen in FIGURE 3. The ring may be annular and split or a helical convolution. The reference 1 indicates part of a piston and 2 the cylinder. The ring is of T-section with the cross-bar 3 of the T constituting a head symmetrical to the stem 4 which constitutes the body of the ring. The cross-bar or head forms projecting ears 5 one on each side of the body 4 in the axial direction of the ring, and the ears represent flanges extending axially from the two flat faces 6, 6 of the ring at its outer edges as indicated more clearly in FIGURE 7. The stem of the T is made as the usual close fit of a piston ring in the groove 7 of the piston 1. The outer face of the head 3 is smoothly cylindrical to run on the wall of the cylinder 2. The body 4 is of rectangular section which may be comparatively narrow as in FIGURE 3 or broader and more squat as in FIGURE 4, and the head 3 is advantageously angled off at its axial ends by being sloped upwards on the respective inner faces 8 from the body 4 towards the tips to form points at the respective ends of the cross-bar section. Thus the ring, in section, has a rectangular body 4 for housing in a piston groove 7 and a wider head 3 in the axial direction to slide on the cylinder wall, the head being undercut at 8 by tapering lines towards its junction with the body. This gives the appearance of sharp ears 5, 5 but the points of the ears may be slightly truncated. In an embodiment the angle of the ends of the cross-bar is about 30° at the tip.

The rectilinear form of the body 4 of the ring may be varied. In FIGURES 1, 2, 6 and 7 the body is tapered symmetrically and inwardly from the head to the bottom of the stem which has advantages in many applications such as avoiding sticking which is useful in diesel engines.

In the foregoing example of FIGURE 1 each end (i.e., projecting ear 5) of the T head 3 has an overhang of 0.0425 inch from the body 4, and in a group of such rings, mounted close together around a piston wall as shown in FIGURE 1, the heads lie outside the surface of the piston pointing up and down in the axial direction. The flanges formed by the ears 5 of the section of one ring can be brought close together with the flanges of adjacent rings, and slightly spaced apart to form oil-catching spaces 9 for the reception of oil scraped from the cylinder wall by said flanges. The piston may be drilled between the grooves to carry away oil caught in the spaces, or when the rings are helical convolutions in a multi-convolution groove, and the oil-catching spaces form a continuous helical space, then the drilled holes may be omitted, because the gas pressure in the combustion chamber will force the oil which has been scraped along the continuous space 9 towards the sump.

The bodies 4 of the T-section may base on the bottoms of their respective piston grooves 7, when under radial compression, or may be designed to have a clearance at the bottom, and in either case with the heads 3 lying entirely outside the periphery of the piston the rings act as bearers and with the groove clearance also as ordinary sealing rings against gas and oil pressure.

To minimize the tendency of the ring to cant with the body 4 tending to tip in its groove 7, the shoulders of the head 3, i.e. the sloping faces 8, as shown in FIGURE 8, may be firmly seated on complemental flarings 15 at the mouth of the groove 7, and in conjunction the body 4 is of the tapered form somewhat as in FIGURE 2, with the root end of the body clear of the bottom of the groove 7. The tapering of the body 4 may be more acute than that of the groove, or the latter may be of rectilinear form as shown to receive the tapered body 4, so that the ring takes the load nearer the outside diameter of the piston.

As shown in FIGURE 6, the groove 7 which houses the ring body leads from a groove 10 wider in the axial direction than the groove 7 and of sufficient dimension to house the head 3 completely when the ring is compressed. Thus the assembly of piston and ring need not act as a bearing ring. This arrangement is developed in FIGURE 2 where there are a plurality of rings in grooves 7 corresponding to the shape of the body section of the ring with the respective heads not only spaced from one another as in FIGURE 1, but the grooves 7 lead from a common wider groove 11 extending in the axial direction of the piston a sufficient distance to house the respective heads 3 of all the rings. As in FIGURE 6, the rings can be compressed completely beyond the outside periphery of the piston so that they do not act as bearing rings.

In another embodiment shown in FIGURE 5, the body 4a of the ring is of half-round section and the D-section so formed is mounted in a substantially semi-circular groove with the flat face of the D disposed so as to protrude away from the piston surface and slide on the cylinder. This D-section is modified so as to have a head axially wider than the flat of the D so as to form ears 5, 5 which may be of angular section as with the T-section of FIGURES 3 and 5.

In the foregoing examples the rings are made from steel wire wound on a mandrel.

I claim:

1. A piston and piston ring assembly for internal combustion engines, comprising a piston having a peripheral groove, and a solid metal piston ring partly in the groove and being resiliently compressible into metal-to-metal contact with the sides of the groove, the ring having in a radial plane containing the axis of the piston a cross-section consisting of a stem positioned between said sides of the groove and of a cross piece externally of the groove and symmetrical relatively to the stem, the cross piece comprising two oppositely extending ears which as seen in cross-section in said plane are oppositely tapered away from said stem to provide a sharp tip at each of the extreme boundaries of the ears, the ears together presenting a radially outermost smooth cylindrical cylinder-engaging surface and each ear presenting a radially inner annular surface to make metal-to-metal engagement with the piston when the ring is compressed into the groove.

2. A piston and piston ring assembly as claimed in claim 1 in which the groove and the stem are of complementary semi-circular forms as seen in cross-section in said plane.

References Cited by the Examiner

UNITED STATES PATENTS

| | | | |
|---|---|---|---|
| 1,601,776 | 10/1926 | Sheiring et al. | 277—236 X |
| 2,785,026 | 3/1957 | Barnhart | 277—171 |
| 2,844,427 | 7/1958 | Muller et al. | 277—169 X |
| 2,866,674 | 12/1958 | Hamlin | 277—172 |
| 2,903,308 | 9/1959 | Barnhart | 277—171 X |
| 3,118,681 | 1/1964 | Fuehrer | 277—171 X |

SAMUEL ROTHBERG, *Primary Examiner.*